United States Patent [19]

Eng

[11] Patent Number: 4,788,413

[45] Date of Patent: Nov. 29, 1988

[54] SYSTEM INCLUDING A PORTABLE HEAT GUN FOR CURING ADVANCED COMPOSITE WORKPIECES

[75] Inventor: Berwyn S. Eng, San Diego, Calif.

[73] Assignee: General Dynamics Corporation/Space Systems Division, San Diego, Calif.

[21] Appl. No.: 111,010

[22] Filed: Oct. 21, 1987

[51] Int. Cl.[4] .......................... F24H 3/00; H05B 1/00
[52] U.S. Cl. .................... 219/364; 219/482; 219/507; 34/48
[58] Field of Search ............. 219/364, 361, 482, 483, 219/489, 490, 501, 507, 509, 510; 34/43, 48

[56] References Cited

U.S. PATENT DOCUMENTS

| | | | |
|---|---|---|---|
| 1,564,896 | 12/1925 | Rinker et al. | 219/364 X |
| 3,261,397 | 7/1966 | Hay | 219/364 X |
| 3,668,370 | 6/1972 | Pattison | 219/364 |
| 3,978,314 | 8/1976 | Shimizu | 219/361 |
| 4,170,729 | 10/1979 | Lane et al. | 219/364 |
| 4,260,875 | 4/1981 | Walter et al. | 219/364 |
| 4,701,595 | 10/1987 | Okutsu et al. | 219/364 |

Primary Examiner—E. A. Goldberg
Assistant Examiner—M. M. Lateef
Attorney, Agent, or Firm—John R. Duncan; Frank D. Gilliam

[57] ABSTRACT

A system for curing advanced composite workpieces including a portable heat gun that provides a flow of heated air against a workpiece. The heat gun is controlled to direct a flow of heated air against an advanced composite workpiece at a predetermined temperature for a predetermined time period and upon cessation of the time period to thereafter direct an unheated flow of air against the advanced composite for a second period of time thereby causing a resin component of the advanced composite to flow within the composite in a prescribed manner and to cure to a desired hardness.

10 Claims, 2 Drawing Sheets

SYSTEM INCLUDING A PORTABLE HEAT GUN FOR CURING ADVANCED COMPOSITE WORKPIECES

BACKGROUND OF THE INVENTION

1. Field of the Invention

This invention relates generally to an improvement in curing advanced composites and more particularly, but not by way of limitation, to a temperature and time controlled heat system gun for curing advanced composites.

2. Description of Prior Art

In the aerospace industry the use of advanced composites is growing because of perceived advantages of strength and weight. These advanced composites may be constructed in a number of ways such as by hand lay-up, filament winding, or tape laying. Such construction includes interleaving sheets of organic fiber such as carbon or graphite with sheets of resin or preimpregnating such sheets or organic fiber with a resin. The construction is then subjected to an appropriate heat and pressure cycle to cause the resin to flow within the organic fiber sheets and to cure and harden the resin.

In a typical application of an advanced composite to an aerospace need, a special graphite fiber cord is to be attached to a series of aluminum attach points. The graphite fiber cord may be attached to each point by merely tying it to the point with a single knot and securing it in place with a thermosettable epoxy resin. To accelerate the cure of the epoxy resin, a heat gun is used. An operator of the heat gun typically manually operates the gun by holding the gun at varying distances from the workpiece, fanning the heat gun over the workpiece, and pressing the trigger of the heat gun to an "on" position as the operator perceives the need for greater or continued heat. Obviously, such a procedure yields variable results according to the skill and the interest of the operator.

If the compound cures too quickly, the epoxy resin will not be allowed to flow throughout the carbon fibers to saturate the joint thereby resulting in a weak unsatisfactory joint. On the other hand, if the compound cures too slowly, the resin will flow away from the knot and saturate the connecting cord by capillary action which action again results in a weak unsatisfactory joint.

It has also been found in the operation of an industrial heat gun in an aerospace application that operator fatigue is a significant factor. If a large number of carbon fiber/aluminum joints are to be fabricated it has been found that during the progress of the work shift and as the operator becomes fatigued, the quality of the joints is found to significantly deteriorate. Also, the experience of the aerospace worker has been found to be a significant factor in the fabrication of such joints. While an experienced worker may be far down the learning curve in the fabrication of these joints and is prepared to fabricate satisfactory joints, an unexperienced worker can be expected to produce highly variable results over what may be an extended learning period until he has acquired sufficient skill and experience. In aerospace applications, unsatisfactory results causes further complications in that costly scrap may result and preclude schedule being maintained for a project.

The need to resolve this situation existed until the emergence of the present invention which provided a temperature and time controlled heat gun system especially adapted for aerospace applications such as the curing of advanced composites. The present invention provides for automatic operation with preset controls that enable the temperature of a heated air stream to be directed against the advanced composite workpiece, the length of time the heat is to be applied, and the length of time a following cooling air stream is to be applied to said composite to be predetermined. Thus, with an automatic operation the operator of the subject heat gun system may cure any number of joints with confidence of consistency and reliability.

A review of the patent literature has uncovered some patents that are of interest. An early heat gun is disclosed in U.S. Pat. No. 1,564,896 entitled COMBINED ELECTRICAL HEATER AND BLOWER issued to S. T. Rinker et al. on Dec. 8, 1925. The Rinker et al. patent teaches a hand held electric hair dryer having a heater and electrically driven blower positioned within a pistol grip housing and arranged to permit an operator to conveniently control and manipulate the device and to effect discharge of either hot air or cold air therefrom.

U.S. Pat. No. 3,978,314 dated Aug. 31, 1976 and issued to Nobuzo Shimizu for an ELECTRIC HAIR DRYER WITH AIR BLOWING CONDITION INDICATOR discloses a hand held electric hair dryer having a handle provided with different colored windows. When a push button control switch for the dryer is activated, signal lamps are selectively lit behind the colored windows to indicate on sight the state of the air blowing from the gun and whether it is warm or not.

U.S. Pat. No. 4,260,875 dated Apr. 7, 1981 and issued to Henry J. Walter et al. for CONTROLLED TEMPERATURE HAIR DRYER discloses a hand held electric hair dryer, the temperature of the air stream flowing from which being automatically controlled by the temperature of the hair being dried. The dryer includes a primary air inlet, a fan for blowing inlet air out of the dryer, and a heater by which the blown air is heated before it is directed against a user's hair. The dryer also includes a feedback air duct and a thermistor positioned in the duct to sense the temperature of air being reflected off the user's hair as it is dried. The thermistor cooperates with an electric control system to switch off or proportionally reduce the power to the heater. Thus, the temperature of the air being blown across the user's hair is continuously monitored as the hair is dried to preclude the hair and scalp of the user from becoming overheated.

U.S. Pat. No. 3,261,397 dated July 19, 1966 and issued to Arthur D. Hay for COMBINED COOLING AND HEATING APPARATUS is also of interest. The A. D. Hay patent discloses an enclosure for electronic equipment at unattended installations that are subjected to low ambient temperatures. The subject apparatus maintains uniform temperatures within the enclosure and provides for flushing or cooling with outside air when the temperatures within the enclosure go above the desired temperatures.

In none of the above cited patents nor in any other patent reviewed in a study of the patent literature was there a disclosure of a temperature and time controlled heat gun system having the necessary controls to control the desired heat and ambient air cycles for desired durations to provide optimum curing of an advanced composite.

SUMMARY OF THE INVENTION

Briefly stated, the present invention provides a temperature and time controlled heat gun system especially adapted to cure advanced composites. The heat gun includes a hollow housing having a generally pistol grip or hand gun configuration and that is provided an air intake port and an air discharge port. A tube, preferably fabricated of a material such as TEFLON, is connected to the housing and directs air issuing from the air discharge duct in a localized area to an advanced composite workpiece that is spaced from the housing. An air blower means and a variable heater means that are positioned within the housing cooperate to heat air that flows through the housing. Presettable control means cooperate with the heater and blower means to cause the heat gun to direct a localized flow of air that has been heated to a predetermined temperature to the advanced composite for a predetermined period of time. After the heater means has heated the air stream for a predetermined period of time, it is disconnected and the blower means then directs a flow of cooling air to the advanced composite for a second period of time in accordance with a predetermined cure cycle for the particular advanced composite.

Further advantages of the invention will be evident from the detailed description, when read in conjunction with the accompanying drawings which illustrate the invention.

DETAILED DESCRIPTION OF A PREFERRED EMBODIMENT

Figure 1:
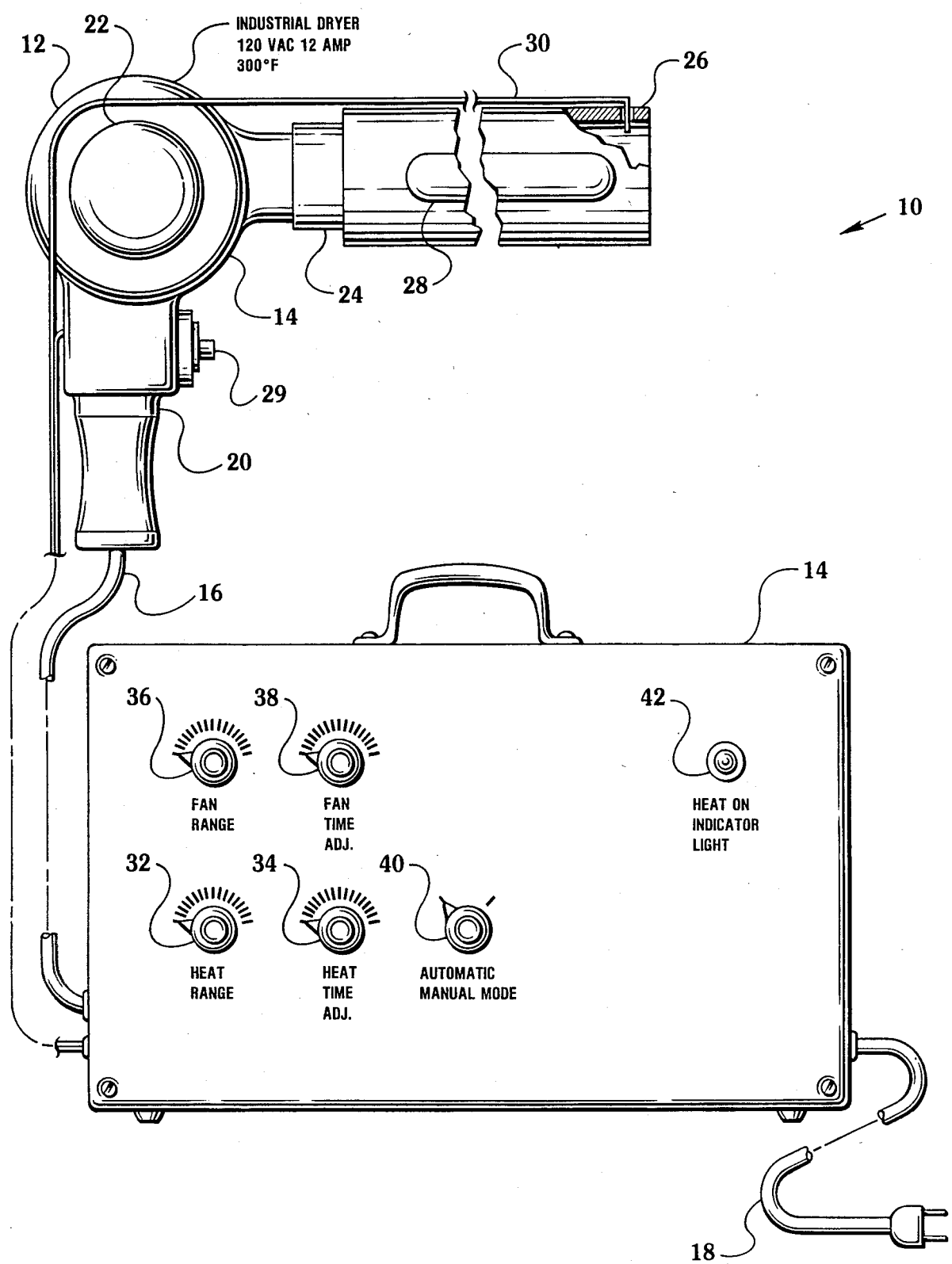
FIG. 1 is a simplified schematic for a heat gun system embodying the present invention.

Referring to the drawings in detail, and particularly to FIG. 1, reference character 10 generally designates a system for curing advanced composites including a portable hand held heat gun that is constructed in accordance with a preferred embodiment of the present invention. The system 10 includes a heat gun 12 that is coupled to suitable control box 14 through suitable cables and circuit wires 16. The control box 12 is connected a conventional 120 V. power source (not shown) through a conventional power cord/plug 18.

The heat gun 12, typically is an industrial heat gun that is rated at 120 VAC, 12 AMP that can provide a heated air stream at 300° F. The heat gun 12 provides a hollow housing 20 having a generally pistol grip configuration and which is provided with an air intake port 22 and an air discharge port 24 to which is secured a suitable tube 26 preferably fabricated from a material such as TEFLON. The TEFLON tube enables the gun 12 to be positioned directly against a workpiece (not shown) and thereby position the discharge port 24 a predetermined distance from said workpiece and more accurately control the temperature of the heated air being discharged thereagainst. The sleeve 26 may be provided with suitable slots 28 to draw in ambient air for mixing with the heated air flowing from the discharge port 24 for direction against the workpiece.

The heat gun 12 is also provided with a suitable trigger button 29 to initiate operation of the system 10.

The heat gun 12 is provided with a suitable heater and blower (not shown in FIG. 1) which enable air to be drawn in through port 22 and heated to a predetermined temperature as it is discharged through sleeve 26 against a workpiece. The sleeve 26 further includes a suitable type of thermocouple wire 32 that enables the temperature of the air stream flowing against a workpiece to be sensed and the heater selectively energized to maintain the air stream at a predetermined level. The thermocouple 30 is connected to the control box 14.

The control box 14 is provided with various controls and indicators that enable the heat gun 12 to apply a flow of heated air against an advanced composite at a predetermined temperature for a predetermined time period and upon cessation of the time period to cause the heat gun 12 thereafter to direct an unheated flow of air against the advanced composite for a second period of time thereby causing a resin component of the advanced composite to flow within the composite in a prescribed manner and to cure to a desired hardness.

By way of example, and not by of limitation, in a special composite system joinder, special graphite fiber cord is attached to a series of aluminum attachment posts or points. The fiber cord is merely tied to each post or attachment point with a single knot and held in place by potting only the knots and posts or attachment points with epoxy resin. The application of heat to the knots and their attachments quickly heats the epoxy resin which liquidizes and saturates the knots and attachments. When the knots and attachments are saturated, unheated air is then applied to the knots and attachment to prevent saturation of the epoxy resin beyond the confines of knots and attachments. Thus, the intent in this example is to apply heat long enough to saturate only the knots and attachments (graphite fiber around the aluminum and post or attachment point) and then quickly cooling the epoxy resin to minimize capillary action along the graphite fiber outside of the confines of the knots and attachment points.

Shown on the control box 14 in FIG. 1 is a control 32 to set the heat range for the gun 12, a control 34 to set the time period that heat is to be applied by the gun 12 and a control 36 to set the fan range and to predetermine the amount of heated or ambient air that is to be applied by the gun 14 to the workpiece. The control box 14 also includes a control 38 to set the time that the fan of the gun 12 is to be energized and a switch 40 to determine whether the system 10 is to be used in the automatic mode with the various parameters and times being determined as herein described or if the system 10 is to be used in a manual mode. A heat on indicator light 40 is also provided on the control box 14 to indicate to an operator whether the heat means of the gun 12 has been activated.

Figure 2:
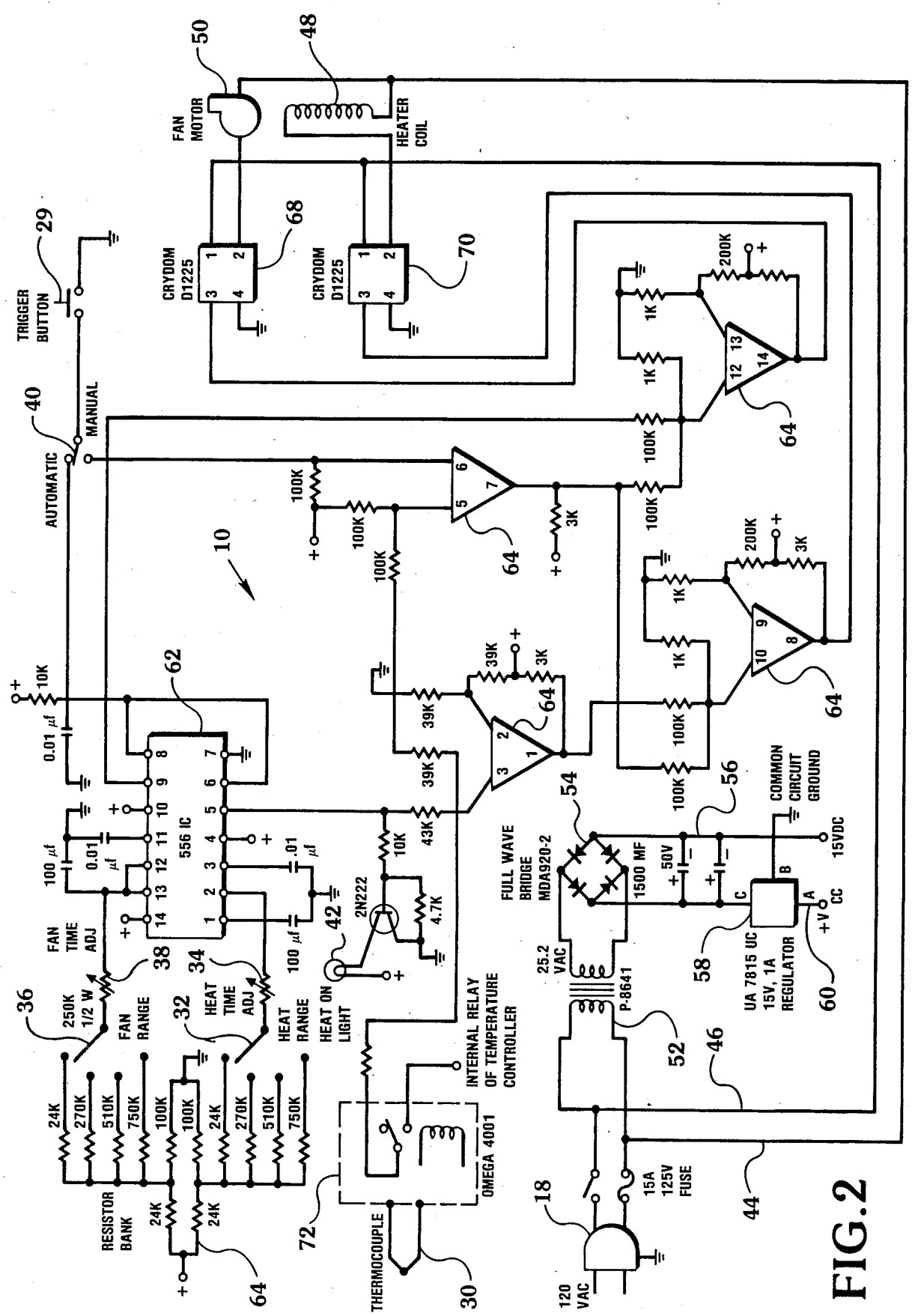
FIG. 2 is a pictorial representation of a heat gun system which utilizes the electrical schematic of FIG. 1.

Referring now to FIG. 2, a simplified schematic of a preferred embodiment of system 10 is illustrated. The 3-prong wall plug 18 connects through the control box 14 through leads 44 and 46 to the heater coil 48 and the fan motor 50 of the heat gun 12. The input plug 18 is also connected through a suitable transformer means 52 such as a model P-8641 made by Stancor to a full wave bridge rectifier 54 such as a model MDA 920-2 made by Motorola to provide 15 VDC. A conventional filtering network 58 and a suitable regulator such as a UA 7815 UC made by Fairchild cooperate to provide 15 VDC on lead 60.

A suitable control circuit 62 in the form of an integrated circuit 5561C made by National Semiconductor Corp. provides the control function for the system 10. The circuit 62 is connected to a suitable resistor bank 64 through various connections to provide the settings for the various functions to be provided by system 10 and as shown the control box 14. The fan range is set by control 36 and variable resistor 38 sets the fan time that the gun 12 will provide heated and ambient air to the advanced composite workpiece to be cured. Similarly, control 32 controls the heat range to be provided by the gun 12 and the heat time adjustment is provided by the variable resistor 34.

The heat light 42 is also connected to the control circuit to provide a visual indication to an operator as to when the heater coil 48 is energized. The control circuit 62 is connected to ground through switch 40 which determines whether the system is to be operated in an automatic mode or in a manual mode. Actuation of the system 10 is provided by trigger button 29. The control circuit 62 is coupled through another integrated circuit 64 for example a LM324 circuit made by Texas Instruments to the fan motor 50 and to the heater coil 48. The LM324 is one circuit but is shown in FIG. 2 as four separate circuits for ease of illustration. Additional integrated circuits 68 and 70 such as CRYDOM D1225 made by Crydon Controls are interposed in the couplings to the fan motor 50 and to the heater coil 48.

The thermocouple 30 is connected to a suitable temperature controller 72 such as an OMEGA 4001 made by Omega Engineering, Inc. which is correspondingly coupled through circuit 64 to control the heater coil 48.

In operation, an operator when he wishes to cure an advanced composite part with the system 10 makes the selections on the control box 14. The heat range and the time that the heater is to be on is set on is set by manipulation of switches 32 and 40, the switch 40 already having been set to the automatic mode. The fan range switch 36 and the fan time adjustment switch 38 are then also set. The gun 12 is then placed again the advanced composite part and the trigger button 29 is depressed to initiate the automatic sequence. The system 10 then directs a flow of heated air against the advanced composite workpiece at predetermined temperature for a predetermined time period and upon cessation of the time period thereafter direct an unheated flow of air against the advanced composite workpiece for a second period of time thereby causing a resin component of the advanced composite to flow within the composite in a prescribed manner and to cure to a desired hardness.

Changes may be made in the combination and arrangement of parts or elements as heretofore set forth in the specification and shown in the drawings, it being understood that changes may be made in the precise embodiment shown without departing from the spirit and scope of the invention as defined in the following claims.

I claim:

1. A system for curing advanced composites including a portable hand held heat gun comprising:
    a hollow housing having a generally pistol grip configuration and provided with an air intake port and an air discharge port;
    an air blower means positioned within said housing and adapted to draw air into the housing through the intake port and discharge air through the discharge port;
    controllable heater means positioned within the housing and adapted to cooperate with the air blower means to selectively heat the air stream discharged through the discharge port;
    means to position the discharge port a predetermined distance from an advanced composite to be cured; and,
    control means cooperating with the heater means and blower means when the discharge has been positioned a predetermined distance from an advanced composite to be cured to cause the heat gun system to direct a flow of heated air against the advanced composite at a predetermined temperature for a predetermined time period and upon cessation of the time period to thereafter cause the heat gun system to direct an unheated flow of air against the advanced composite for a second period of time thereby causing a resin component of the advanced composite to flow within the composite in a prescribed manner and to cure to a desired hardness.

2. The system of claim 1 wherein the controllable heater means comprises:
    an electrical heater coil that may be selectively connected to an electrical source so as to heat the air stream flowing through the housing to a chosen temperature.

3. The system of claim 2 wherein the controllable heater means further includes a thermocouple means that senses the temperature of the heated air being directed against an advanced composite by the heat gun and selectively connects the heater means to an electrical source so that the temperature of the heated air is maintained at a predetermined temperature.

4. The system of claim 3 wherein the control means further includes a selectable means for determining the period of time that the heater means is to apply heat to air being discharged from the air discharge port of the housing.

5. The system of claim 4 wherein the control means further includes a selectable means for determining the period of time that air continues to be discharged from the air discharge port of the housing after the heater means ceases applying heat to said air.

6. The system of claim 3 wherein the thermocouple means is variable and presettable to a predetermined temperature.

7. The system of claim 3 wherein the means to position the discharge port from the composite includes a hollow tube is attached to the hollow housing so that it surrounds the air discharge port and directs the flow of air issuing from the discharge port to a point spaced from the housing in a localized flow.

8. The system of claim 9 wherein the hollow tube is composed of TEFLON.

9. The system of claim 8 wherein the control means is positioned within an enclosure spaced from the heat gun and is connected thereto by cable means directing electrical power and the control signals to the heat gun.

10. The system of claim 9 wherein the control means is connectable to a source of 120 V. 60 cycle power.

* * * * *